United States Patent
Christensen et al.

(10) Patent No.: US 7,239,777 B1
(45) Date of Patent: Jul. 3, 2007

(54) METHOD AND APPARATUS TO COHERENTLY COMBINE HIGH-POWER BEAMS IN SELF-IMAGING WAVEGUIDES

(75) Inventors: Scott E. Christensen, Boulder, CO (US); Iain T. McKinnie, Denver, CO (US); Jose Robert Unternahrer, Lafayette, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 0 days.

(21) Appl. No.: 11/372,420

(22) Filed: Mar. 9, 2006

(51) Int. Cl.
*G02B 6/26* (2006.01)

(52) U.S. Cl. .................. 385/27; 385/28; 385/39; 359/349; 372/108

(58) Field of Classification Search ............ 385/27–29, 385/39, 46–47; 372/6, 9, 26, 31, 108; 359/333, 359/349
See application file for complete search history.

(56) References Cited

U.S. PATENT DOCUMENTS

| | | | |
|---|---|---|---|
| 3,832,029 A | 8/1974 | Bryngdahl | |
| 4,087,159 A | 5/1978 | Ulrich | |
| 4,345,212 A | 8/1982 | Seppala et al. | |
| 4,794,345 A | 12/1988 | Linford et al. | |
| 4,933,649 A | 6/1990 | Swanson et al. | |
| 4,982,166 A | 1/1991 | Morrow | |
| 5,172,264 A | 12/1992 | Morrow | |
| 5,396,570 A | 3/1995 | Jenkins et al. | |
| 5,694,408 A * | 12/1997 | Bott et al. ...................... 372/6 |
| 5,862,288 A | 1/1999 | Tayag et al. | |
| 6,125,228 A | 9/2000 | Gong | |
| 6,385,228 B1 | 5/2002 | Dane et al. | |
| 6,697,192 B1 | 2/2004 | Fan et al. | |
| 6,894,828 B2 | 5/2005 | Pelouch et al. | |
| 7,042,631 B2 * | 5/2006 | Smith et al. ................. 359/333 |
| 2002/0114572 A1 | 8/2002 | Bouda | |
| 2003/0063884 A1 | 4/2003 | Smith et al. | |
| 2005/0053322 A1* | 3/2005 | Jenkins et al. ................. 385/22 |
| 2005/0169323 A1* | 8/2005 | Spariosu et al. ................ 372/9 |

* cited by examiner

*Primary Examiner*—Hemang Sanghavi
(74) *Attorney, Agent, or Firm*—McDermott Will & Emery LLP

(57) ABSTRACT

An apparatus for combining laser beams into a single high power output beam. The apparatus includes a self-imaging waveguide (SIWG) with parallel reflective elements that have a length that is an integer multiple of the self-imaging or Talbot length of the waveguide or an integer fraction of this self-imaging length. The apparatus also includes a system for controlling the phase of each of laser beams provided to an inlet of the waveguide. The phases are controlled, e.g., with phase shifters using active feedback or control signals from the inlet to the waveguide, such that a coherently combined beam is produced at the outlet of the waveguide; and this beam is typically a high power beam of 1 kW or higher. The phase shifters are often controlled to phase-lock the input beams and may be operated to steer or aim the output beam from the waveguide.

18 Claims, 10 Drawing Sheets

METHOD AND APPARATUS TO COHERENTLY COMBINE HIGH-POWER BEAMS IN SELF-IMAGING WAVEGUIDES

BACKGROUND OF THE INVENTION

1. Field of the Invention

This invention is in the field of lasers, and more specifically, the invention is related to methods and apparatus to combine multiple laser beams into a single high brightness beam.

2. Relevant Background

Directed energy weapons (DEW) based on delivery of laser energy to a target have been pursued for many years. Such laser beams must meet stringent criteria that include scalability to very high powers (e.g., powers of hundreds of kilowatts (kWs) to megawatts (MW) or more) in order to deliver sufficient cumulative energy on a target. DEW laser beams also require nearly diffraction limited beam quality to minimize the illuminated area at the target. Producing such beams from a single laser source is very difficult. The difficulties are due in part to the fluence (power or energy per unit area) often being high enough to destroy optics or optical components in the beam path. This is not surprising since a primary intent of DEW lasers is to produce destructive fluence (e.g., high power or energy per unit area). One clear objective for a designer of a DEW or other high energy laser is to generate high energy or destructive fluence at the target but not in the laser beam generator itself.

Another difficulty in creating beams of very high powers is that it is generally the case that beam quality degrades as laser power levels are increased. This degradation with increasing power is frequently a consequence of thermally induced distortions. Poor beam quality causes the laser area at the target to be larger than it would be for a perfect or non-distorted beam and consequently, in distorted or lower quality beams the fluence is reduced. As a result of these considerations, considerable effort has been directed to devising methods to combine the outputs from multiple lower power lasers into a single high power beam. In this description, the term "power" is typically used but may be thought of as meaning the more general phrase of "power or energy." In creating a high power laser, the quantity that frequently matters more is often energy delivered to a target area although in DEW applications it is also frequently the case that the energy must be delivered in a certain amount of time to maximize lethality. High energy delivery can be achieved through highly energetic short duration pulses or through lower peak power pulses of long duration that in some cases last several seconds or more.

One significant consideration in combining beams to produce high power or energy is scalability, e.g., many separate sources often must be combined. A number of beam combination methods have been disclosed that rely on polarization combining two beams (see, for example, U.S. Pat. Nos. 4,982,166 and 5,172,264 to Morrow), but such combination methods are of little use for DEW applications which typically involve the combination of many beams.

Additionally, several scalable beam combination methods have been devised that can be divided into two broad categories: those relying on phased array concepts and those relying on spectral beam combination. Other non-scalable techniques do exist (e.g., temporal stacking of multiple pulses as described in U.S. Pat. No. 4,345,212 to Seppala and Haas), but these techniques require specific pulse formats and complex arrangements to implement. Phased array (PA) concepts rely on the creation of multiple laser beams whose phase can be controlled to a sufficiently high degree such that interferometric methods can then be utilized to combine the multiple beams into a single beam. Spectral beam combination techniques, on the other hand, use dispersive optical elements such as diffraction gratings to cause laser beams at different wavelengths to propagate in a single direction as one beam. Examples of spectral beam combination techniques have been disclosed in U.S. Pat. No. 6,697,192 to Fan et al. for example.

While some argue that spectral beam combination is generally superior, this technique has not proven useful or superior in many applications. For example, certain high-power applications, such as long-range coherent laser radar (ladar) applications, require the radiation to be single frequency, which precludes use of spectrally diverse methods. Another problem in implementing these techniques is that spectral beam combination requires an optical element to be inserted into the multiple beams, which then becomes susceptible to damage. As noted above, DEW applications are aimed at generating sufficient optical power to destroy objects. Hence, the placement of objects in the beam path is a great concern. One reason this issue is frequently not addressed by developers of spectral beam combination systems is that laboratory demonstrations are generally aimed at demonstrating physics principles rather than operational high power laser systems and are carried out at comparatively low power levels. Specifically, current combination demonstrations are generally performed at total power levels measured in Watts or at most hundreds of Watts, which is at least 3-5 orders of magnitude lower than what is required for operational DEW and other high power beam systems.

The same scalability and damage issues also apply to existing phased array or PA concepts. One subset of PA concepts uses diffractive elements, in particular phase gratings, to combine multiple beams. The general idea is that a phase grating can be constructed such that a single incident beam is split into multiple diffractive orders. By using this arrangement, reverse multiple beams interfering in a phase grating can be combined into a single beam. An example of such a method is disclosed in U.S. Pat. No. 4,933,649 to Swanson et al.

A second subset of PA concepts uses phase conjugation, e.g., conjugation based on stimulated Brillouin scattering or SBS, to phase lock multiple sources. Such concepts are disclosed, for example, in U.S. Pat. Nos. 6,385,228 to Dane and Hackel and 4,794,345 to Linford et al. However, as with spectral beam combiners and phase gratings, these approaches require insertion of optical elements into the beams, which is undesirable in DEW and other similar systems.

A third type of phased array is similar to phased arrays used in microwave radar as well as radio-telescopes. In these designs, multiple parallel beams are placed side by side to form a large area. Locking the phases of the individual beams to a common value ensures that the beam acts like a single beam with a larger area. A limitation of this approach is that of side lobes, which lead to energy deposition outside the intended target area. This represents an efficiency loss on the one hand and may also lead to collateral damage at unintended locations hit by the high power laser beam if this type of PA were used in a DEW system.

From the above discussion, it is clear that beam combination methods that do not require insertion of objects in the beam would be advantageous. The use of hollow waveguides to combine two beams has been demonstrated at low power by Jenkins and Devereux in U.S. Pat. No. 5,396,570, but the described method only discloses a method for combining Gaussian beams rather than a combination method for more general transverse intensity distributions. Gaussian profile beams are useful in many optical situations but are in other applications undesired because they have wide "tails" that prevent multiple beams from being positioned in proximity without interference. Truncation of laser beams produces intense, localized "hot spots" through diffraction, which are detrimental to safe scaling of the laser power to high levels. A further property of Gaussian beams is that they always remain Gaussian as they propagate through linear devices including mirrors, prisms, and lenses. More general beams, including super-Gaussian beams, do not behave in this manner, and consequently, a device that works with Gaussian beams often will not work in the same manner with a non-Gaussian beam. For example, the Fourier transform of a Gaussian beam is still Gaussian, whereas the Fourier transform of a higher order super-Gaussian beam is not super-Gaussian. Since imaging systems generally produce Fourier transformations (for example, the light distribution at the focal plane of a lens is the Fourier transform of the light distribution one focal length in front of the lens), it is not a priori a given that the appearance of a Gaussian beam profile is also an indication of a true imaging condition. Furthermore, a number of limitations arise from the waveguide geometry taught in the Jenkins patent that makes it difficult and cumbersome to apply for operational high power lasers. Another severe limitation of the Jenkins patent, as well as other existing waveguide configurations, is that they do not teach methods to carry out coherent combination of beams that are not a priori mutually coherent. Simply inputting multiple beams into a combiner without adequate phase control is not sufficient to ensure the emergence of a single coherent beam. Without phase control, the output will on average simply be the sum of intensities as if no coherent summation occurred. This is unacceptable in the construction of high power lasers of DEW and similar applications.

Waveguides are increasingly used in very low power telecommunications systems. In this area, several devices have been disclosed that perform certain beam splitting or beam combination functions but do not enable operation of a high power laser at high efficiency. Such devices include a hexagonal geometry device described in U.S. Pat. No. 6,125,228 which uses "kaleidoscope" effects to produce multiple beams and is aimed at wavelength division multiplexing (WDM) and similar low power applications. A further example of an integrated optical device for WDM applications is disclosed by Tayag and Batchman in U.S. Pat. No. 5,862,288. Another tapered waveguide device is described by Bouda in U.S. Patent Application 2002/0114572 A1. This device uses non-adiabatically tapered waveguides to produce beam splitting functions with an integrated optical device. The non-adiabatic waveguide is essential to the described device in order to produce a uniform illumination of multiple subsequent waveguides, but such a waveguide may be highly detrimental to the beam combination devices developed for DEW or other high power beam systems. For example, Bouda illustrates coupling from one input beam to a multiplicity of output beams where the coupling loss is measured in several decibels (dB). One dB equals 21% loss and 2 dB equals approximately 37% loss. Such high losses may be acceptable for low power applications but are generally unacceptable for high power lasers. One reason is that electrical power to drive the laser is very limited and must be used efficiently. Another reason such losses are unacceptable relates to thermal management. A high power laser operating at 500 kW that loses 20% of the light before transmission would need to safely dispose of 100,000 W of laser power, which is a very significant power level.

Self-imaging in an optical tunnel is described by Bryngdahl in U.S. Pat. No. 3,832,029, but Bryngdahl does not describe requirements to use such devices for coherent beam combination. Similarly, U.S. Pat. No. 4,087,159 to Ulrich describes a number of self-imaging waveguide devices, but it does not teach a system that can be scaled to high power and that can coherently combine many beams into one higher power beam.

SUMMARY OF THE INVENTION

The present invention provides a significant advance over the above-discussed techniques and systems by providing methods to combine multiple laser beams into a single coherent beam without requiring insertion of optical elements into the laser beam. The methods of the present invention also permit the use of non-Gaussian beam profiles.

In one aspect of the invention, hollow one-dimensional waveguides and the fractional self-imaging Talbot effect are used to interfere multiple input laser beams to produce a single high quality output beam. In another aspect of the invention, the method permits reproduction of both Gaussian and non-Guassian mode profiles from input to output. This is particularly important in some applications as the use of non-Gaussian beam profiles permits closer stacking of input beams without truncation. In yet another aspect of the invention, the beam combining method allows for the length of the waveguide to be shortened through the use of adiabatic tapers by effectively shortening the Talbot length.

In some embodiments of the methods of the invention, the use of fractional Talbot imaging is combined with a servo and phase control of the input beams to maintain phase relationships between beams in order to enable the coherent combination. In another aspect of the inventive method and corresponding systems, the phase control of the input beams is used to steer, or redirect, the output beam. In some cases, the method involves the use of 2-dimensional waveguides to produce a single output beam from a 2-dimensional array of input beams.

More particularly, an apparatus is provided for combining two or more laser beams from one or more sources into a high-power output beam. The apparatus includes a waveguide that has an inlet and an outlet at opposite ends of a channel or chamber defined by two waveguide elements, which may be two planar and parallel elements with reflective surfaces facing the channel. The apparatus also includes a system for controlling the phase of each of the laser beams provided to the inlet of the waveguide. The phases are controlled such that a coherently combined beam is produced at the outlet of the waveguide, and this beam is typically a high power beam of 1 kW and often, higher power levels. The system for controlling the phase may be an amplifier system with a series of amplifiers that amplify the input beams. Typically, phase shifters or other devices are provided to adjust the phase of one or more of the beams, and the phase shifters are in some embodiments controlled based on the monitoring of properties of the beam emerging at the outlet of the waveguide. In many preferred embodiments, the phase shifters are controlled to phase-lock the input beams, and in some cases, the phase shifters are controlled to select the phases of the input beams to steer or aim the location of the combined beam at the waveguide outlet (i.e., to set a position on a plane transverse to the beam propagation path in the waveguide at the outlet). Further, preferred embodiments of the invention may utilize a self-imaging waveguide (SIWG) that has a length (or a length of its reflective surfaces) that is selected to be an integer multiple of the self-imaging or Talbot length of the waveguide or an integer fraction of this self-imaging length. The input beams may have non-Gaussian (such as super-Gaussian) intensity profiles, and interestingly, the beams may be input to the inlet of the waveguide with relatively small separation distances (e.g., distances that are in the range of 2 times to 10 times the width of the smaller of two adjacent pairs of input beams).

In another aspect of the invention, a method is provided for combining laser beams into a high-power output beam. The method includes providing a SIWG having an inlet and an outlet (such as a hollow SIWG), and then generating two or more input laser beams that each have a particular phase. These input laser beams are amplified and then transmitted to an inlet of the SIWG. The method includes controlling the phases of the input laser beams to produce a combined laser beam formed from the amplified beams by combination in the SIWG and extracted or output from the outlet of the SIWG. Such controlling of the phases may include shifting the phases of one or more of the input laser beams so as to phase-lock the beams, and this phase-locking may be performed based on monitoring of the output beam emerging from the outlet of the SIWG.

DETAILED DESCRIPTION OF THE PREFERRED EMBODIMENTS

Figure 1:
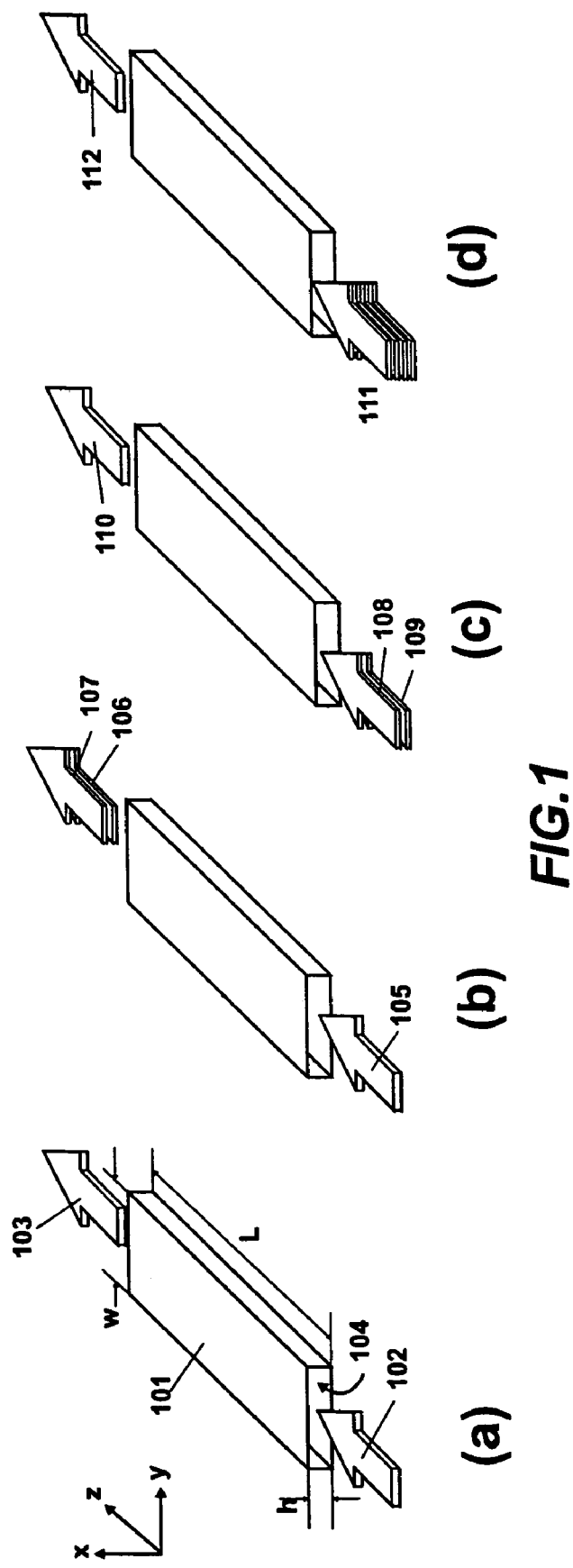
FIGS. 1(a) to 1(d) show exemplary geometry of a planar waveguide implementation for use in combining beams.

FIGS. 1(a) to 1(d) show the general idea behind using a planar waveguide 101 for beam splitting and combination. In a 1-dimensional (1D) geometry, the straight waveguide 101 is defined by three parameters: the length L along the z direction, the width W in the "unguided" y direction, and the height h in the "guided" x direction. The terms "unguided" and "guided" are used to refer to the degree to which the presence of the waveguide 101 affects propagation of an injected laser beam 102 as it propagates through the waveguide 101 and emerges as an output beam 103. A measure of whether the waveguide 101 affects the beam 102 or not is to consider whether the diffraction distance or Rayleigh range, $R_R = \pi D^2/4\lambda$, is longer or shorter than the waveguide length L, where D is a characteristic diameter of an input beam 102. When $R_R \ll L$, the beam 102 diffracts fast in comparison with the length L of the waveguide 101, which physically results in the beam 102 reflecting off the sides of the waveguide 102 as it propagates along its length L, provided only that the waveguide height is small enough to be on the order of the input beam diameter. When $R_R$ is not $\ll L$, the beam 102 may propagate unperturbed through the waveguide 101 as if the guiding structure was not present.

Two-dimensional guiding is discussed further below. However, for the present planar waveguide discussion, it is assumed that beam diffraction is slow in the unguided direction. One candidate type of laser used for high power beam combination is a waveguide laser, e.g., as is disclosed, for example, in U.S. Pat. No. 6,894,828 to Pelouch et al., where the beam may be highly asymmetric along the x and y axes and which is incorporated herein in its entirety by reference. As an example, in the x-direction, the beam radius (half the beam diameter D) may be $\omega_x = 0.05$ mm while in the y-direction the beam radius may be $\omega_y = 5$ mm. From the above equation, the diffraction distance in the x-direction (assuming a wavelength of 1 micrometers) is calculated to be 7.8 mm and the diffraction distance in the y-direction is 78 m. For waveguide lengths up to several meters, it is then an excellent approximation that the beam 102 is unguided in the y direction, provided that the width W of the waveguide 101 is large enough that it does not physically interfere with the beam 102. In the x-direction, on the other hand, waveguide lengths L longer than several millimeters will be guiding the beam 102. This provides only that the height h of the guide 101 is on the order of the beam diameter, which is often the case.

In low power applications, the waveguide 101 is in many cases fabricated from solid materials, such as a multilayer structure comprising a glass with a high refractive index being sandwiched between two layers having a lower reflective index. In such a structure, the guiding mechanism is total internal reflection. For high power applications, it is desired that the interior space 104 of the waveguide 101 is hollow and either evacuated or filled with material (for example a gas) that does not break down or produce non-linear optical effects in the presence of high optical field strengths. In this hollow waveguide case, the waveguide walls may be formed, for example, from metal with highly polished interior surfaces. Other examples of structures include glass or crystals having highly reflective coatings deposited on the interior surfaces.

Self-Imaging Wave Guides (SIWG): Embodiments of the invention are based on the self-imaging properties of appropriately designed waveguides and disclose specific methods for implementing the principles discussed in the context of FIG. 1. Generation, amplification, and transport of high power coherent light in such devices has been disclosed in detail in U.S. Pat. No. 6,894,828 to Pelouch et al. cited above, and in U.S. Patent Application 2003/0063884 to Smith et al., both hereby incorporated in their entirety by reference, and will not be discussed in detail except as the effects pertain to the present invention. Self-imaging in waveguides refers to the concept that if the length of the waveguide equals the self-imaging waveguide (SIWG) length (also referred to as the "Talbot length") $L_S = 4nh^2/\lambda$ then an input beam represented by 102 reproduces itself as beam 103 at the output plane, as illustrated in FIG. 1(a). Here, the refractive index of the waveguide is n and $\lambda$ is the wavelength. In the case of a vacuum or a gas filling the interior of the waveguide, $n \sim 1.0$, so that the SIWG length reduces to $L_S = 4h^2/\lambda$. It is furthermore the case that if the length L is reduced to $L=L_S/2$ then two spatially separated replicas 106 and 107 result from an input beam 105, as illustrated in FIG. 1(*b*). Since waveguide propagation is reciprocal, it is also then the case that two input beams 108 and 109, as shown in FIG. 1(*c*), will produce a single output beam 110, provided that the relative phases of the two input beams are the same. It is then also possible by appropriate design of the waveguide, in particular by carefully performing length selection, to use this same technique to combine a multiplicity of input beams into a single output beam. This is illustrated in FIG. 1(*d*) where four input beams 111 are combined by a waveguide to produce one output beam 112.

Figure 3:
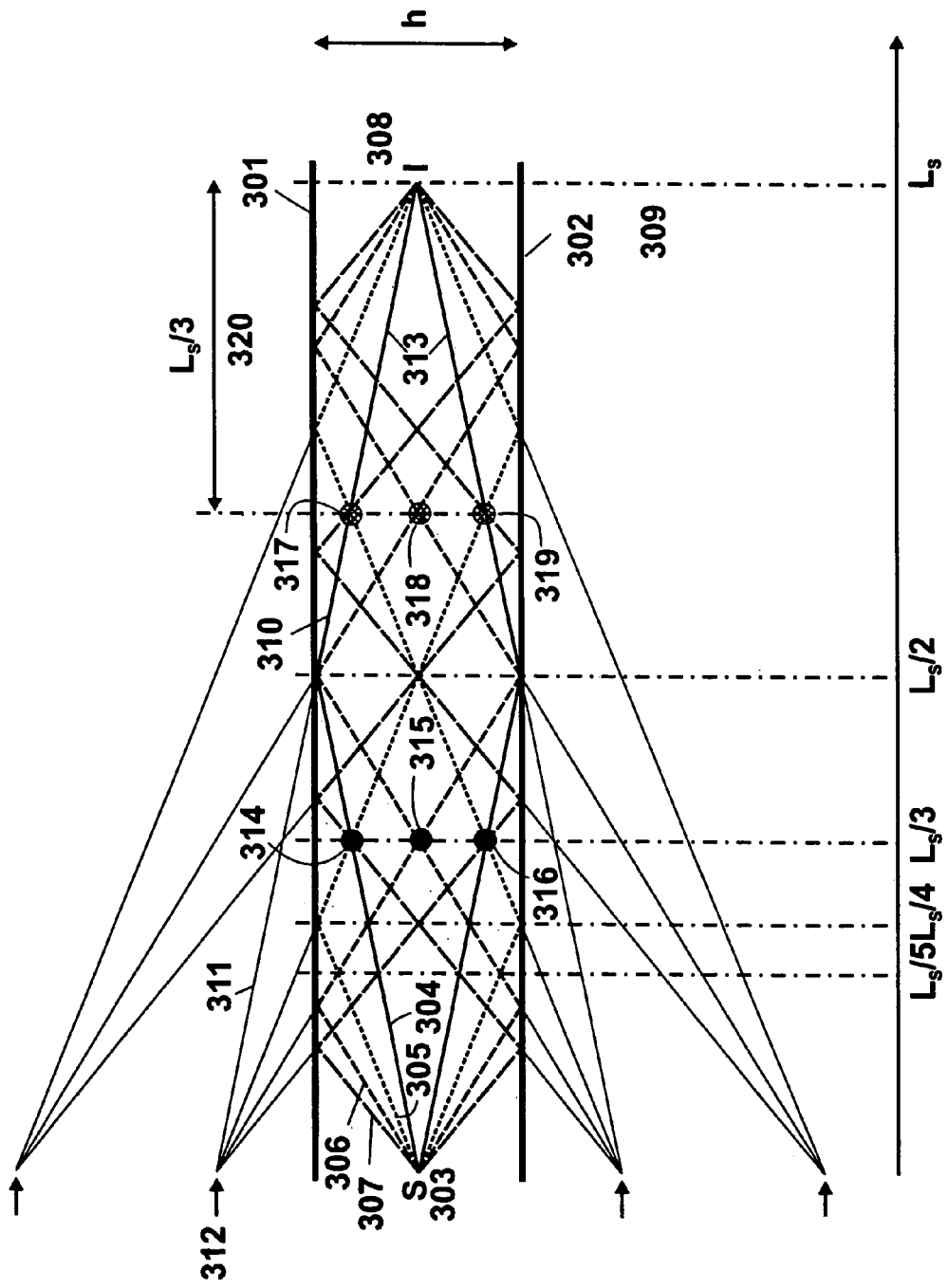
FIG. 3 illustrates the self-imaging principle.

To aid the reader in understanding how self-imaging waveguides function, FIG. 3 illustrates a straight and parallel one-dimensional waveguide of the present invention formed by reflecting surfaces 301 and 302 implementing imaging. Light propagation is most appropriately discussed in terms of eigenmodes of the waveguide, but to provide a simple understanding of the phenomenon, we will at first adopt a ray tracing approach. In this approach, guided modes can be viewed as rays propagating in the waveguide at specific angles to the axis of the waveguide. Light 303 input as a source S at the left side of the waveguide is decomposed into the permitted eigenmodes. The lowest order mode propagates as ray 304, while higher order modes propagate as rays 305-307. In general, many modes can propagate, but only the first few are shown for clarity. When a ray intersects the upper or lower waveguide surface 301, 302, it is reflected according to the well-known law of reflection. As a result, a point exists along the length of the guide at which the rays 313 corresponding to the lowest order mode (the "fundamental" mode) intersect at a point I also denoted by numeral 308. This occurs at the self-imaging length (also known as the Talbot length) $L_S=4h^2/\lambda$. It is also known that within the validity of the paraxial approximation rays from the other propagating modes also converge to the same point 1 or 308. As a result, propagation over one (or a multiple of) Talbot length reimages the source distribution of light. Such images are frequently referred to as Talbot images, but it is noted that Talbot imaging is most frequently used, not with waveguides, but with diffraction gratings, pinhole arrays, and similar devices that create an array of virtual sources.

A useful way of looking at this phenomenon is to note that an observer at the imaging point 308 cannot tell exactly from where the rays originated. In fact, to such an observer, a ray 310 appears to originate from a point along the extended path 311. It is then possible to "unfold" the waveguide geometry in such a manner that all reflected rays are traced to their apparent origin. If this is done, one finds that light observed at 308 appears to arise from a set of virtual sources denoted by arrows in FIG. 3 and exemplified by 312.

In addition to the true images formed at multiples of the Talbot length, fractional Talbot images (also known as "Fresnel images") are also formed at fractional Talbot lengths, that is, at distances $L_S/2$, $L_S/3$, . . . . $L_S/N$, as illustrated in FIG. 3. In this case, it is found that a multiplicity of images are formed across the height of the waveguide. For example, three images denoted by black dots 314-316 are located at ⅓ the Talbot length. Injecting three input beams at the locations of the black dots will produce a single output image at image point 308. By symmetry, the waveguide could also be shortened to the length $L_S/3$ indicated by arrow 320 and the three beams injected at locations 317-319 with the same result. However, careful control of the waveguide and the relative phase between the two beams is required in order to realize such single output beams. Similarly, a single source S injected at the waveguide input can be used to split the beam in two by using a waveguide that is one half the Talbot length. Extension of this concept to more than 3 beams is possible by noting that N transverse images will appear for a length L/N.

Laser Beam Profiles: Laser beams propagating in a direction z are characterized by a transverse (along the x and y coordinates) intensity distribution that for high power operation preferably has a smooth profile. Although the validity of the disclosed invention in not limited to specific beam profiles, a common type of beam profile is the super-Gaussian beam, which is a generalized form of the common Gaussian beam. A super-Gaussian beam has characteristic beam radii $\omega_x$ and $\omega_y$ in the x and y directions and resulting intensity distributions commonly defined by one of the following Equations (1)-(4). In cases where the beam is characterized by only one coordinate, the subscript used is "0", for example when $\omega_x=\omega_y$ the symbol $\omega_0$ is used.

$$\text{Circular distribution:} \quad I(x, y) \propto \exp\left[-2\left[\frac{x^2 + y^2}{\omega_0^2}\right]^{Sg0}\right] \quad (1)$$

$$\text{Square distribution:} \quad I(x, y) \propto \exp\left[-2\left[\left[\frac{x^2}{\omega_x^2}\right]^{Sg0} + \left[\frac{y^2}{\omega_y^2}\right]^{Sg0}\right]\right] \quad (2)$$

$$\text{Elliptical distributions:} \quad I(x, y) \propto \exp\left[-2\left[\frac{x^2}{\omega_x^2} + \frac{y^2}{\omega_y^2}\right]^{Sg0}\right] \quad (3)$$

$$\text{Rectangular distribution:} \quad I(x, y) \propto \exp\left[-2\left[\left[\frac{x^2}{\omega_x^2}\right]^{Sgx} + \left[\frac{y^2}{\omega_y^2}\right]^{Sgy}\right]\right] \quad (4)$$

Figure 2:
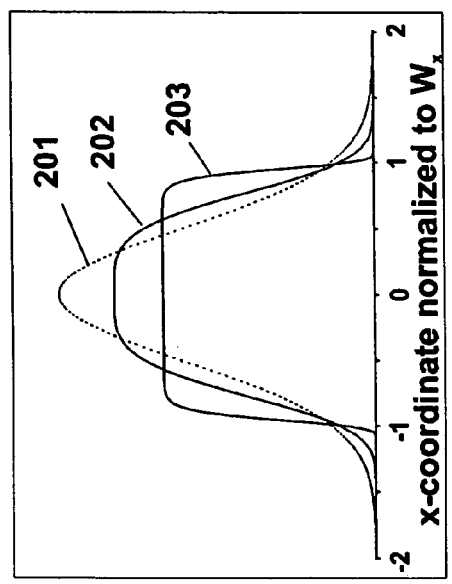
FIG. 2 illustrates the form of Gaussian and super-Gaussian beams and the difference in interference between them.
Figure 2:
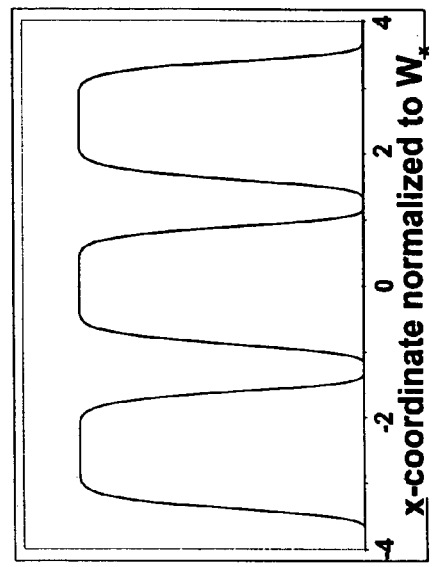
Figure 2:
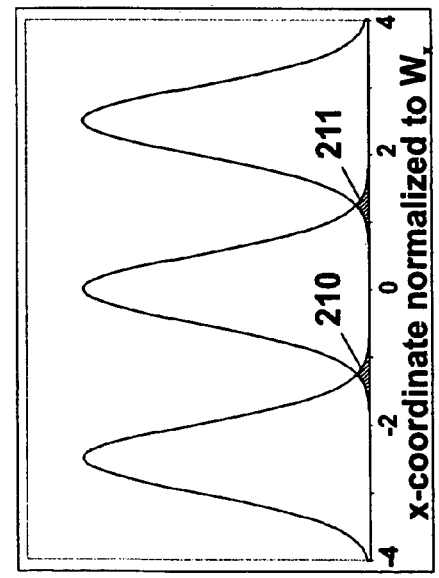

The super-Gaussian index (Sgx, Sgy, or Sg0 when the two are equal) defines the height and width of the distribution and, in particular, how rapidly the intensity decreases with increasing distance from the center of the beam. When the super-Gaussian index equals one, the conventional Gaussian beam results. FIG. 2(*a*) illustrates the one-dimensional beam profiles for a Gaussian beam (201) having Sg0=1 and super-Gaussian beams having Sg0=2 (curve 202) and Sg0=10 (curve 203). It can be seen that as the super-Gaussian index increases the central peak flattens out, which reduces peak intensity and promotes scaling to high power. The beam also becomes more confined along the x axis, which is important in beam combination because it means that beams to be combined may be placed closer together without causing interference. This can be seen in FIGS. 2(*b*) and 2(*c*). In FIG. 2(*b*), three Gaussian beams of width $\omega_x$ are placed with an x-axis separation of 2.25 $\omega_x$. In this case, the hatched areas 210 and 211 indicate interference between the three beams. In FIG. 2(*c*), three fourth-order (Sg0=4) super-Gaussian beams of the same width are placed side by side with the same separation of 2.25 $\omega_x$. In this case, there is no interference between the beams.

Figure 4:
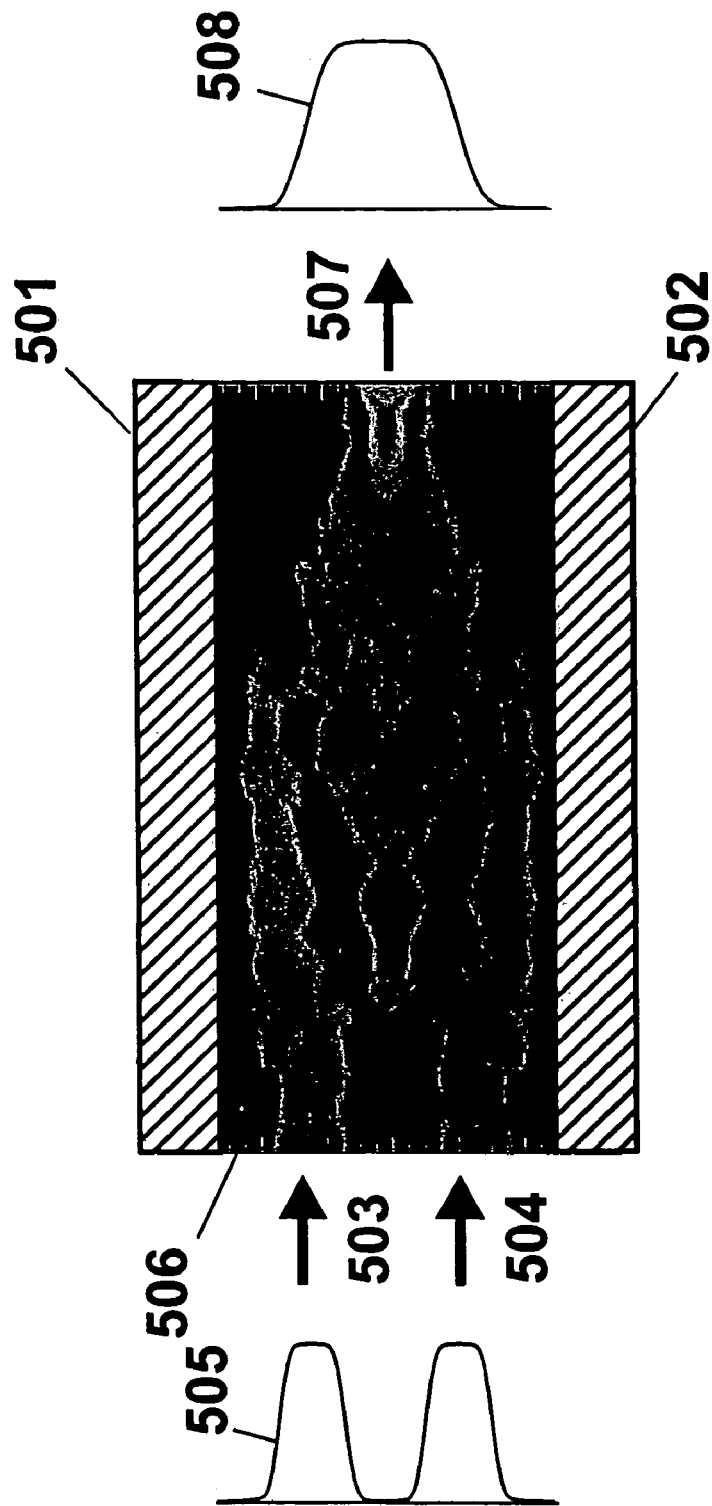
FIG. 4 illustrates a numerical simulation of coherent combination of two super-Gaussian beams.

Coherent beam combination according to the present invention will now be described and/or demonstrated with numerical simulations verified with experimental measurements. FIG. 4 uses a numerical simulation of the combining method of the invention to demonstrate that non-Gaussian beams will replicate (image) through fractional Talbot imaging. In FIG. 4, the waveguide is formed by element surfaces 501 and 502 (e.g., planar side elements with reflective surfaces facing inward in the waveguide). Two input beams 503 and 504 are injected at the left side of the waveguide. The transverse profiles are super-Gaussian as illustrated by the intensity distribution 505. The beams 503, 504 propagate through the interior of the waveguide 506 and interfere along the propagation direction to produce local intensity pattern reproduced in grey-scale. At the output of the waveguide, a single beam 507 emerges having a spatial beam profile that is also super-Gaussian. This is illustrated with curve 508. Detailed computations of this type show that a wide variety of beam profiles can be reproduced as a single output beam. The computations also show that it is important that the input beams have the proper phase relationship or the result will not be a single beam. For example, in the simple case of a straight waveguide and two input beams, the phases should be substantially equal in order to produce a single output beam. It is also the case that combination of beams in the manner described leads to image magnification. For example, in the illustrated case of using two input beams, the output beam size is magnified by a factor of two.

Figure 5:
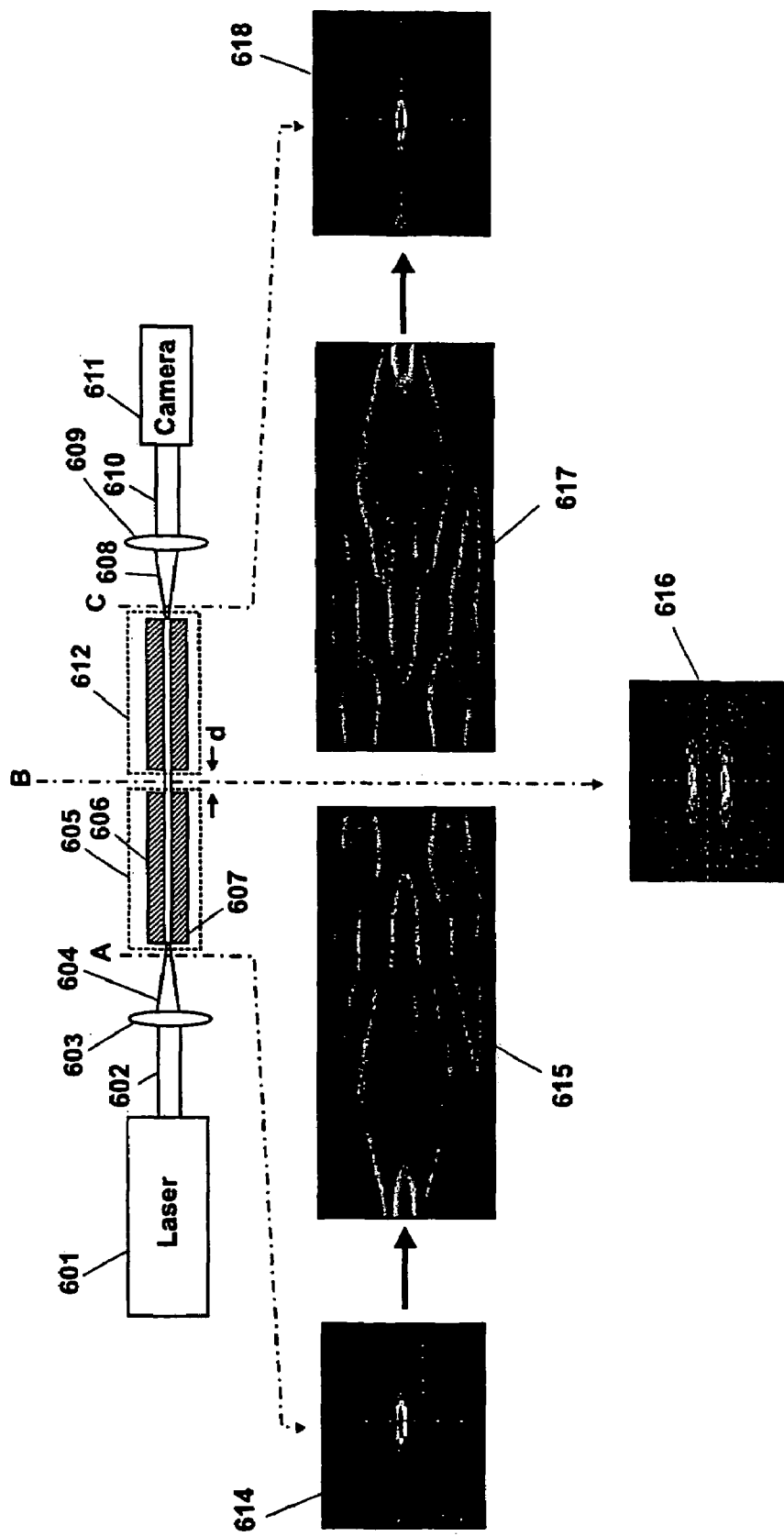
FIG. 5 illustrates an experiment conducted by the inventors that demonstrates the beam combination principle.

FIG. 5 illustrates an experiment conducted by the inventors to prove that the concept of splitting and combining beams using hollow waveguides works in accordance with the numerical calculations described herein. At the time of the experiments, beams with super-Gaussian profiles were not available so experiments were conducted with substantially Gaussian beams. In FIG. 5, a laser 601 operating at 2 μm produced a laser beam 602 which was incident upon a cylindrical lens 603. The cylindrical lens 603 focused laser beam 604 in the vertical plane onto the input end of a hollow waveguide assembly 605 made up of upper and lower waveguide reflectors 606, 607. The length of the waveguide was L=36 mm long and had a height of substantially 380 μm. For this geometry, the Talbot length is 280 mm, but symmetry was used to reduce the actual length to ⅛ of the Talbot length or 36 mm. The purpose of the first waveguide assembly 605 was to produce two beams. Following waveguide assembly 605 was placed a second identical waveguide assembly 612. The two waveguide assemblies 605, 612 were separated longitudinally by a very small gap d. At the end of waveguide assembly 612, the output beam 608 was collimated with a second cylindrical lens 609 to form collimated beam 610 that was incident on a camera 611 capable of recording the transverse intensity pattern in the laser beam 610 in a cross-sectional plane C. The camera was also placed at cross-sectional plane A to capture an image of the intensity at the output of the laser 601. By removing waveguide assembly 612, the camera could also be moved to record the intensity pattern at the output of waveguide assembly 605.

Image 614 shows the intensity pattern at the laser at plane A, which has an elliptical shape. The computer simulation pattern 615 predicts that this single beam input pattern should produce a double image at plane B. This is verified by image 616 from a camera. By inputting this double image into waveguide assembly 612, the computer simulation 617 predicts that the double image should be transformed back into a single beam at the output of 612. Image 618 captured by a camera verifies that this is indeed the case. This experiment confirms the imaging functionality of the fractional Talbot imaging concept in a waveguide according to embodiments of the invention. It also verifies that the computer simulations accurately predict the behavior of actual waveguides.

Phase Locking: The preceding disclosure illustrates the principles of operation of a beam combiner according to the invention. However, simply inputting beams into a waveguide is generally insufficient for the beams to coherently combine as one beam. In addition to inputting beams at proper positions and pointing angles having substantially the same intensity profile, it is also desirable that the beams have the same polarization and are locked together with the proper phase relationship. It is generally straightforward to ensure that a multiplicity of beams have the same polarization state. Ensuring that they are phase-locked is, however, far from trivial, particularly as the number of beams increases, but such phase-locking is an important aspect of many embodiments of the invention. Dissimilar phases of the beams will reduce the maximum attainable beam intensity when the beams are combined.

An optical beam propagates in free space with an electric field of the form $E(t)=E_0\sin(kz-\omega t)$, where $E_0$ is the absolute value of the field strength, $k=2\pi/\lambda$ and $\omega=2\pi c/\lambda$ is the angular frequency of the light (c=speed of light). It is well known that interfering two light beams of equal field strength produces an interference signal of the form $1+\cos(\Delta\phi)$, where $\Delta\phi$ is the phase difference between the beams. Beam combination with high efficiency is more effective when unintentional phase differences ("phase errors") between the beams are minimized or reduced. If this is not effectively achieved, the addition of N beams with random phases produces a combined beam on average having an intensity proportional to $NI_0$, where $I_0=|E_0|^2$ is the intensity of a single beam. Coherent combination refers to beam combination where phase errors are minimized, in which case the total combined intensity scales with the number of beams as $|NE_0|^2=N^2I_0$. For small numbers of beams, the difference may not be a significant concern; however, for large numbers of beams N, the difference has significant implications on efficiency of the system in delivering maximum intensity at a target.

Given the above expression for E(t), it is evident that spatial propagation differences $\Delta z$ much smaller than one wavelength (for example, <<1 micron) are sufficient to produce significant phase errors and consequently, loss of combination efficiency. This follows from the phase error $\Delta\phi$ being given by $\Delta\phi=k\Delta z=2\pi\Delta z/\lambda$. It is noted here also that future weapons grade lasers are planned for operation at relatively short wavelengths (typically near 1 μm as compared with the 10 μm wavelength lasers used in some systems, e.g., the Jenkins patent cited in the Background of the Invention). At the longer wavelengths, tolerances are relaxed by a factor of 10, but, even so, it is exceedingly difficult to ensure that propagation errors are sufficiently low without active phase control. This is particularly the case in mobile environments, such as aircraft, where equipment is subject to vibrations, shock, thermal expansion/contraction, and other effects that effect changes in optical path lengths. Such other effects include phase differences that arise as a result of beams propagating through different amplifier chains.

FIG. 6(a) illustrates a beam combination system 800 which incorporates phase error sensing according to the invention. In the figure, a master oscillator laser 801 is used to provide a stable phase reference laser beam 802. Laser beam 802 is coupled into beam combiner 800 where a series of partially reflecting mirrors 803-804 and a fully reflecting mirror 805 splits the power in beam 802 into generally N beams 806-808 of lower power. Generally, the mirrors 803-805 are designed such that beams 806-808 have approximately the same power. Each of the split beams is next coupled into an amplifier subsystem. For example, beam 806 is coupled into amplifier subsystem 810. Each amplifier subsystem comprises a number of parts, the most important ones being a phase adjuster 811 and an optical amplifier 813. The subsystem 810 also contains a pump source 834 for the amplifier 813, and it may also incorporate lenses or other optical elements 835 and 836 to efficiently couple light into and out of the amplifier 813. Input beam 806 is coupled through phase adjuster 811 as beam 812, through optic 835, and into amplifier 813. The amplifier 813 increases the power of the optical beam 812 and outputs an amplified beam 814 after transmission through optic 836.

For clarity only, the details of one amplifier subsystem 810 are shown, but it is to be understood that such a subsystem typically exists for all beams 806-808. As a result, N amplified beams are produced that propagate through sampling optics 815-817 and emerge as beams 818-820 which are coupled into a waveguide assembly 822 comprising 824 and 825. The waveguide assembly 822 is designed and arranged such that a single coherently combined beam 826 emerges at the output end when the phases between the input beams have the proper relationship. The purpose of phase measurements and phase adjustments is to ensure that the relative phases of the input beams 818-820 are such that this coherent combination takes place resulting in a substantially single-lobed beam emerging at the output from the waveguide beam combiner. This is preferably accomplished by monitoring an aspect of the output intensity profile and adjusting the phases of the input beams to produce a beam profile that meets a pre-determined criterion. Such a criterion may vary from one application to the next and may, as examples, include one or more of the following:

Minimizing output beam $M^2$

Minimizing sidelobe intensity

Minimizing transverse intensity variations

Maximizing on-axis beam intensity

Maximizing beam Strehl ratio.

Monitoring the output beam profile may be accomplished in a number of different ways, including monitoring light scatter from downstream optical elements or through the insertion of a beam sampler into the output beam. This beam sampler may in moderate power cases include an optical element, such as a partly reflecting optical surface. In high power cases, it may also advantageously include a very fine wire of high thermal conductivity material, such as tungsten. When a beam sampler is inserted into the beam, it is preferably done some distance away from the end of the waveguide so that the beam footprint is greater than at the waveguide output, and, hence, the intensity incident on the sampler, such as a wire, is below damage limits. For example, it may be desirable to place a wire with a diameter on the order of 25 micrometers into the beam at a point where the beam width is 25 cm. In such a case, the fraction of power incident on the wire is only approximately 0.01%. If the laser is operating at an output power of 100 kW, the power incident on the wire is 10 W. Since the wire would be designed to scatter, rather than absorb, incident power, the amount of power absorbed in the wire can be made relatively small, such as less than 1 W.

We assume for the present discussion that a wire 842 is present in the beam 841. The long dimension of the wire is into the paper. For clarity in illustration, the wire is shown as a large dot, but it is normally the case that the wire diameter is substantially smaller than the transverse extent of the beam. The wire will generally scattered light 845 over a wide range of angles, and a detector 843 is set up to detect some of this scattered light. In this example, it is assumed that the wire 842 is placed in the middle of the output beam 841 so that the detected light intensity is proportional to the beam intensity at the center. In this case, the beam combination criterion is maximizing the on-axis intensity, and the purpose of multi-dither servo 830 is to alter the phases of beams 806-808 such that the mean signal on line 829 is maximized.

In the case of multiple (N) beams, an equal number N phases are adjusted. Strictly speaking, generally one phase is left to "float" as a reference and the other (N−1) phases are adjusted relative to this reference. A number of methods can be used to perform this co-phasing operation. It is possible to simply adjust each phase in turn and see whether phase alterations increase of decrease the detected intensity. However, this approach is generally very slow. In addition, if the detected intensity begins to decrease, one cannot typically tell which beam is causing the problem until the beams are individually tested. This method is essentially a neural network.

A more preferred method of the invention is to use a multi-dither servo in which encoding of signals is used to separate individual phase error contributions. To implement this method, the phase of one beam may again be left to float as a reference, while the others are adjusted to that reference phase value. In order to separate the channels, each control signal 831-833 from servo 830 is composed of two parts. One is the slow ("DC") control signal that varies the mean phase. The second part is a small fast dither at a specific frequency unique to each beam. The amount of dither is generally small, such that the magnitude of the dithered phase is $<<2\pi$. By dithering the phase of individual beams at frequencies unique to each beam the optical signal 845 and hence, the electrical signal 829 contain amplitude variations at the multiple dither frequencies. Since the frequencies for all channels are unique, the contributions can be separated electronically in servo 830, and the amplitude at each frequency determined. By altering the DC part of the control signal, the amplitude modulation for each beam can be driven to a predetermined state corresponding to maximum on-axis beam intensity. This process is carried out in parallel on all channels resulting in phase-locking of all beams at the input to waveguide assembly 822.

Several algorithms can be used to perform the locking, including those that dither individual phases sequentially and others that dither all phases simultaneously. An example of the former would be a system where the phases are first adjusted in pairs followed by co-phasing of all pairs. One reason why simultaneous dithering of all phases may be desired is to note that the problem is similar to other problems involving multi-parameter optimization. It is well-known, for example in the design of optics, that steepest ascent or hill-climbing methods may get trapped at local maxima in searching for a global maximum. This may be avoided through the use of stochastic techniques that randomly step the global maximum search routine over a large portion of parameter space. Hybrid methods that combine random stepping with local hill-climbing may also be used.

The phase shifters, exemplified by 811 and 837, may be any type of device that can produce an optical phase shift in response to an electrical signal. Suitable devices include liquid crystal phase modulators and electro-optic phase modulators. The master oscillator 801 and amplifiers, exemplified by 813, may be any suitable devices at any radiation wavelength. Of particular interest are Nd and Yb based systems operating near 1 μm because of the relative ease with which high powers can be generated at high efficiency. Another specific wavelength range of high interest is 1.4-1.7 μm because of the availability of efficient and reduced eye-hazard lasers based on erbium (Er). The master oscillator 801 may advantageously be a rod laser, a fiber laser, or a waveguide laser, or any other laser with suitable characteristics operating with a single frequency at a power level, for example, in the range of 0.1-100 W. As an example, in experiments carried out by the inventors, the laser 801 was a single-frequency NPRO laser purchased from Lightwave Electronics. The amplifiers 813 may be fiber amplifiers, waveguide amplifiers, or conventional bulk amplifiers and may be designed to each output beams at a power level of $P_a=1$–10 kW. If there are N beams in the assembly 800, the output power in beam 826 would consequently be $NP_a$.

Figure 6:
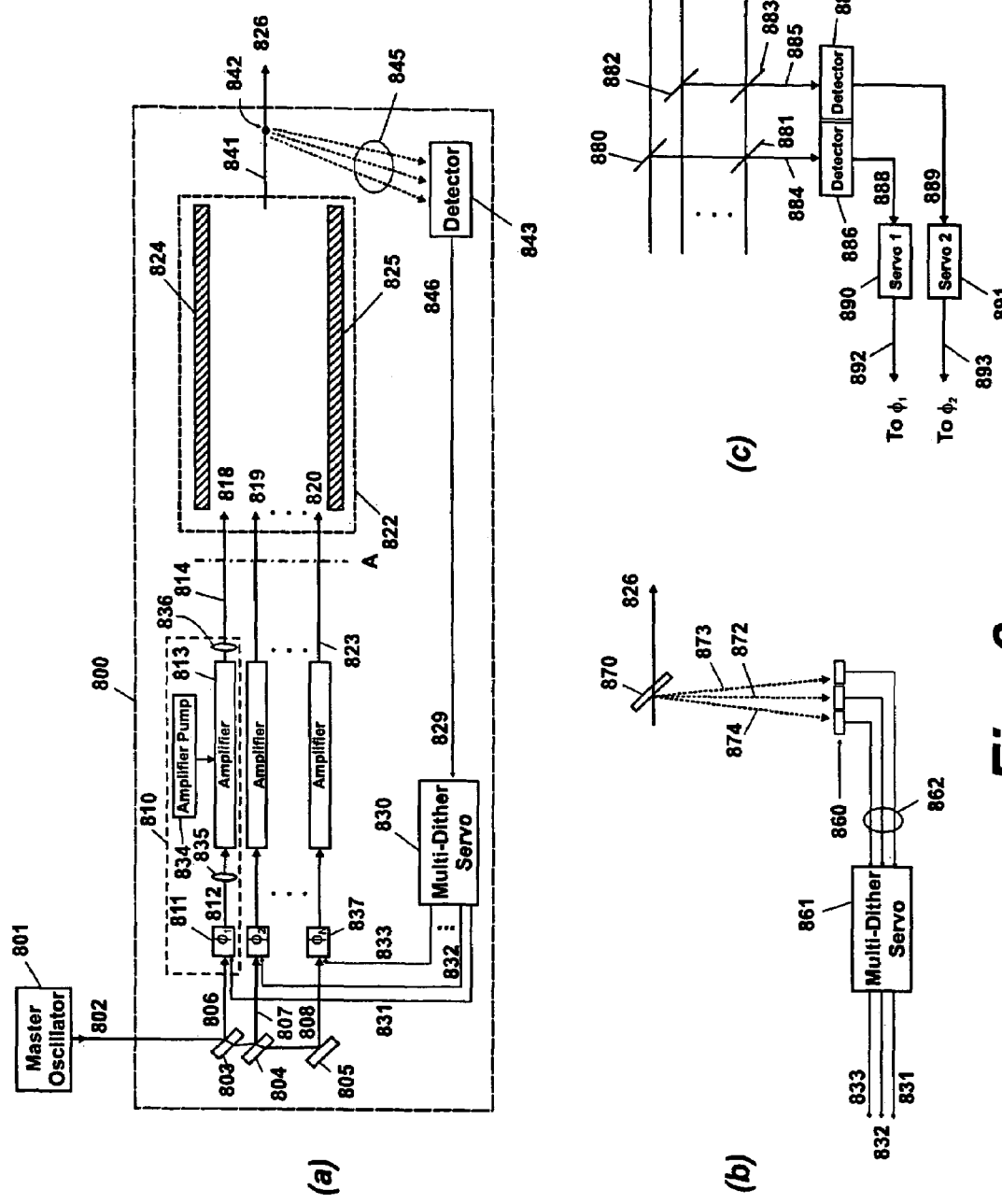
FIG. 6 illustrates a beam combination architecture incorporating phase control to phase-lock multiple beams.

The general architecture illustrated in FIG. 6(*a*) can be used in situations where the beam quality metric is different than on-axis intensity. An alternative method is illustrated in inset FIG. 6(*b*). As shown, this is a case where a sampling optic 870, which may be a flat piece of glass, is used to pick off a very small portion of the power in output beam 826. The picked off sample is directed to a set of three detectors collectively labeled 860. The size and spacing of the detectors 860 is selected such that the central detector primarily receives power in the part of the beam corresponding to the central desired lobe, represented by line 872. The two outer detectors "look at" the sidelobes represented by lines 873 and 874. Detected signals proportional to the amount of power in the central lobe and sidelobes may then be transmitted as signal 862 to the multi-dither servo 861. As before, the role of multi-dither servo 861 is to output control signals 831-833 to the phase shifters in each of the channels. Thus, the control outputs are essentially the same in this case as in the wire scattering case noted above. A difference, though, is the method of measuring the quality of the beam and converting that beam quality information into control signals 831-833. Given that the disclosed method can be used with 3 detectors (two may also be used e.g. if one looks at the main lobe and the other at one sidelobe), the method may be generalized to any number of detectors, such as replacing detectors 860 with an array containing many pixels, for example 256 or 512 or more. In this case, a great deal of detailed information about the beam intensity profile can be readily obtained, which may be useful both to phase lock the beams using various criteria and also to evaluate the beam quality from a diagnostics perspective.

The phase locking method described above may be referred to as operating in the far field after the combination is performed. It is also possible to combine beams in the "near field" prior to combination, for example at a plane indicated by line A in FIG. 6(*a*). FIG. 6(*c*) illustrates one method that may be implemented. One of the beams going into the beam combiner is designated as the reference, and in FIG. 6(*c*), this is beam 820. For each of the other beams 818-819, beam samplers (for example weakly reflecting mirrors) 880 and 882 are used to divert samples of the beams 818 and 819. Beam samplers 881 and 883 are used to pick off samples of beam 820 in such a manner that beam 884 comprises the coherent addition of a sample of beam 818 picked off with sampler 880 and the sample picked off beam 820 with beam sampler 881. Similarly, beam 885 comprises the coherent addition of a sample of beam 819 picked off with sampler 882 and the sample picked off beam 820 with beam sampler 883. Beams 884 and 885 can now be separately detected using detectors 886 and 887 and the detected electrical signals 888 and 889 sent to two separate servos 890 and 891 that independently output control signals 892 and 893 to the phase control elements. An advantage of this approach is that by separately mixing each beam with the reference beam it is not necessary to use multi-dither techniques to know the relative phase between any one beam and the reference.

It is an important aspect of the invention that the type of beam combination system described in FIG. 6 is useful with both pulsed and continuous-wave (CW) lasers. In the CW case, it is possible to maintain continuous phase lock because the beams are always present. This is not the case when the laser is pulsed, and if phase lock is established at one time, at the time of the next pulse the relative phases may have drifted thereby not producing the appropriate phase control. In such circumstances, it is possible to inject a separate laser beam into the system that traverses the same path as the main beam. The function of this separate laser beam (which may also be a sample of the master oscillator beam) is to keep the system co-phased until the main beam is fired.

Figure 7:
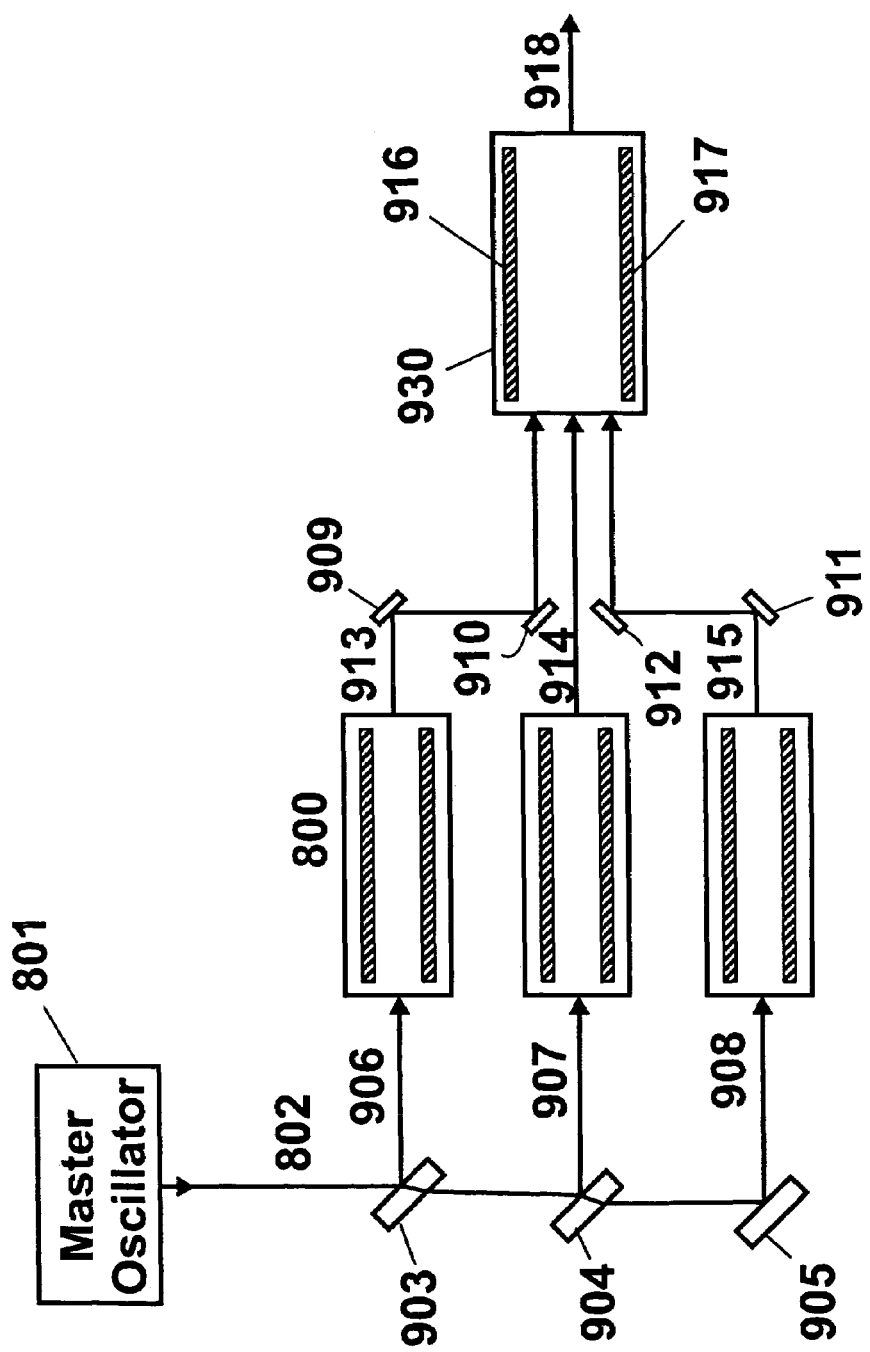
FIG. 7 illustrates an architecture incorporating cascading coherent beam combiners according to the invention.

The beam combination system as described above can in principle be used to combine any number N of beams. In practice, it may be necessary to limit the number of beams to a number N in the range of, for example, 5-15. In order to scale to higher power levels, it is possible to cascade multiple beam combiners of the invention. FIG. 7 illustrates an architecture for a 2-stage design. In FIG. 7, a master oscillator 801 again outputs a single-frequency beam 802 which using reflectors 903-905 is used to divide power into multiple beams 906-908. The output beams 913-915 from beam combiners 800 are then directed (for example with the use of optics 909-912) into a second stage beam combiner 930 including reflectors 916 and 917 to produce a single output beam 918. Although three beam combiners 800 are shown in FIG. 7, a smaller or larger number is clearly also possible. Phase locking of beams 913-915 for proper combination in the second stage beam combiner formed by reflectors 916, 917 may be done in a similar manner to what was described with respect to FIG. 6 but has been omitted from FIG. 7 for clarity. Based on this cascading principle, it will also be clear to those skilled in the arts that additional stages may be added as desired, enabling scaling to very high powers. If each stage combines N beams and there are M stages, the total number of combined beams equals $N^M$.

Alternative Embodiments and Considerations: The relationships between image locations and waveguide geometry generally follow the simple formulas presented above. However, exact locations are dependent on additional parameters and, in particular, the construction and materials used in the waveguides. For example, refractive indices slightly alter the Talbot imaging length, and the design of a proper waveguide preferably accounts for such alterations for optimal results. It is consequently often desirable to determine the proper construction of a waveguide through numerical calculations or experimental determinations or a combination of the two. In such simulations, it is sometimes better to perform a backwards calculation in which the desired output is injected into the output end of a combiner and requirements on input beams are determined from propagation of the output beam back through the waveguide. It is furthermore the case that symmetry relations can be used to reduce the length of waveguides. In general, if a centered, on-axis output is desired, the length of a waveguide beam combiner may be reduced by a factor of 4. For example, a three-beam combiner could be reduced in length from $L_s/3$ to $L_s/12$. This was in fact the geometry used in the experiments discussed in conjunction with FIG. 5.

The above discussion has assumed that the waveguide has parallel sides. It is also possible, and often advantageous, to construct tapered waveguides where the height of the waveguide decreases with propagation distance. An advantage of tapered guides is that the length can be decreased. The Talbot length for a hollow waveguide having input height $h_1$ and output height $h_2$ is given by the formula $L=4h_1h_2/\lambda$. The utility of such a tapered guide can be seen by noting that if, as an example, the input height is designed to be 300 µm in order to accommodate 3 input beams each occupying a 100 µm section, then by tapering the guide to 100 µm at the output the length of the guide can be reduced by a factor of 3 from 360 mm to 120 mm. Such decreases in length are desirable to save space as well as to reduce requirements on maintaining a close spacing over an extended length. When tapered waveguides are utilized it is understood that symmetries can be exploited for further length reductions, and that all phase control methods apply equally well to straight (parallel) and tapered waveguides.

Figure 8:
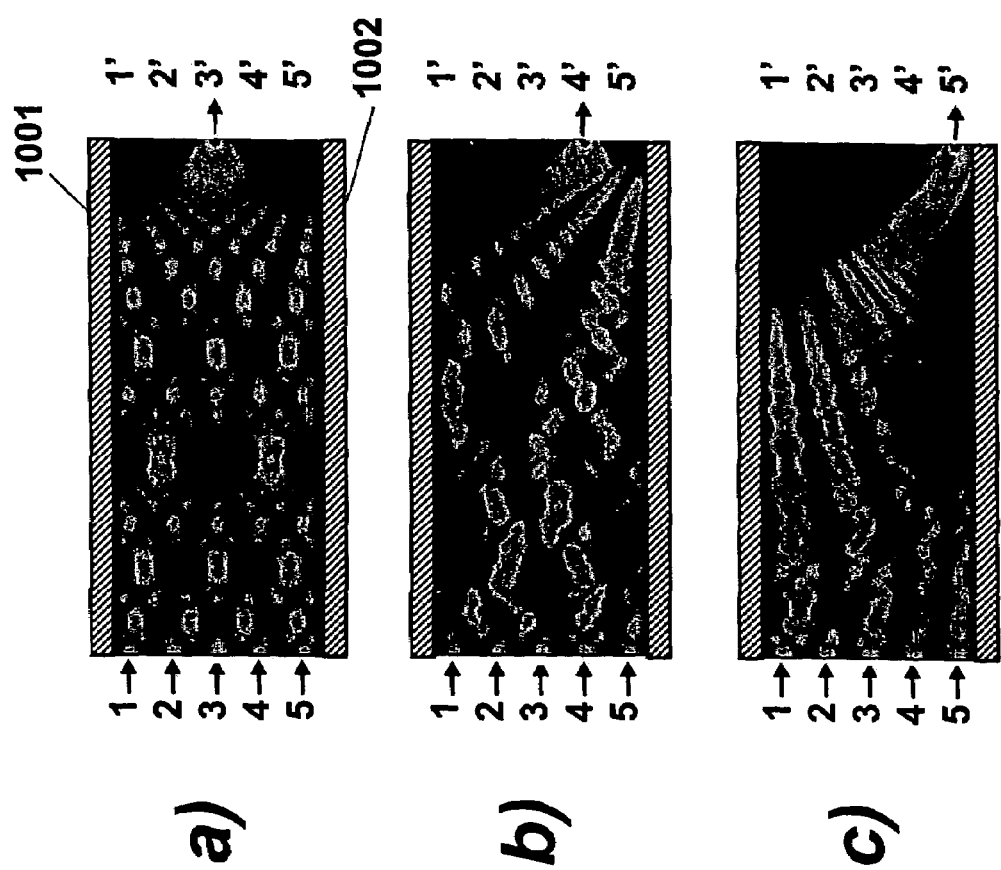
FIG. 8 illustrates beam steering using waveguides and phase control.

A further aspect of the present beam combination invention is the use of phase control on the incident beams to effect beam steering. This is illustrated in FIGS. 8(a)-8(c) for a case where 5 incident beams are combined into one. In the illustrated case, the waveguide is formed of reflective planes 1001 and 1002 that are parallel. In the numerically simulated case shown, the waveguide assembly can be viewed as a switch having five input positions labeled 1-5 and marked by arrows, as well as 5 output positions labeled 1'-5'. In a common beam combination case, it is desirable to use the waveguide formed by reflectors 1001, 1002 to coherently combine five input beams at locations 1-5 into a single beam centered at the output of the waveguide at location 3'. The simulation shown in FIG. 8(a) illustrates that this is possible, which is consistent with the invention described above. It has also been demonstrated using the simulations that proper phase control of the input beams permits one to steer the single output beam to any of the five output locations 1'-5'. This is illustrated in FIGS. 8(b) and 8(c), where relative phase shifts between the input beams cause the output beam to be steered to output locations 4' and 5', respectively. Steering to locations 1' and 2' is also clearly possible but is not explicitly shown if FIG. 8 since they correspond to cases shown in FIGS. 8(b) and 8(c) flipped in the vertical plane. It is noted that beam steering often means steering a beam angularly rather than in position. However, it is well known in the art that simple devices, such as lenses, may be used to translate position into angle. Consequently the disclosed method may serve at least two purposes. One is such angular steering. The other is that phase control as described may be used to switch the position of beams. This may be useful, for example, if the beam combiner is followed by another set of waveguides. In this case, phase control can be used to direct light into a specific subsequent waveguide.

Figure 9:
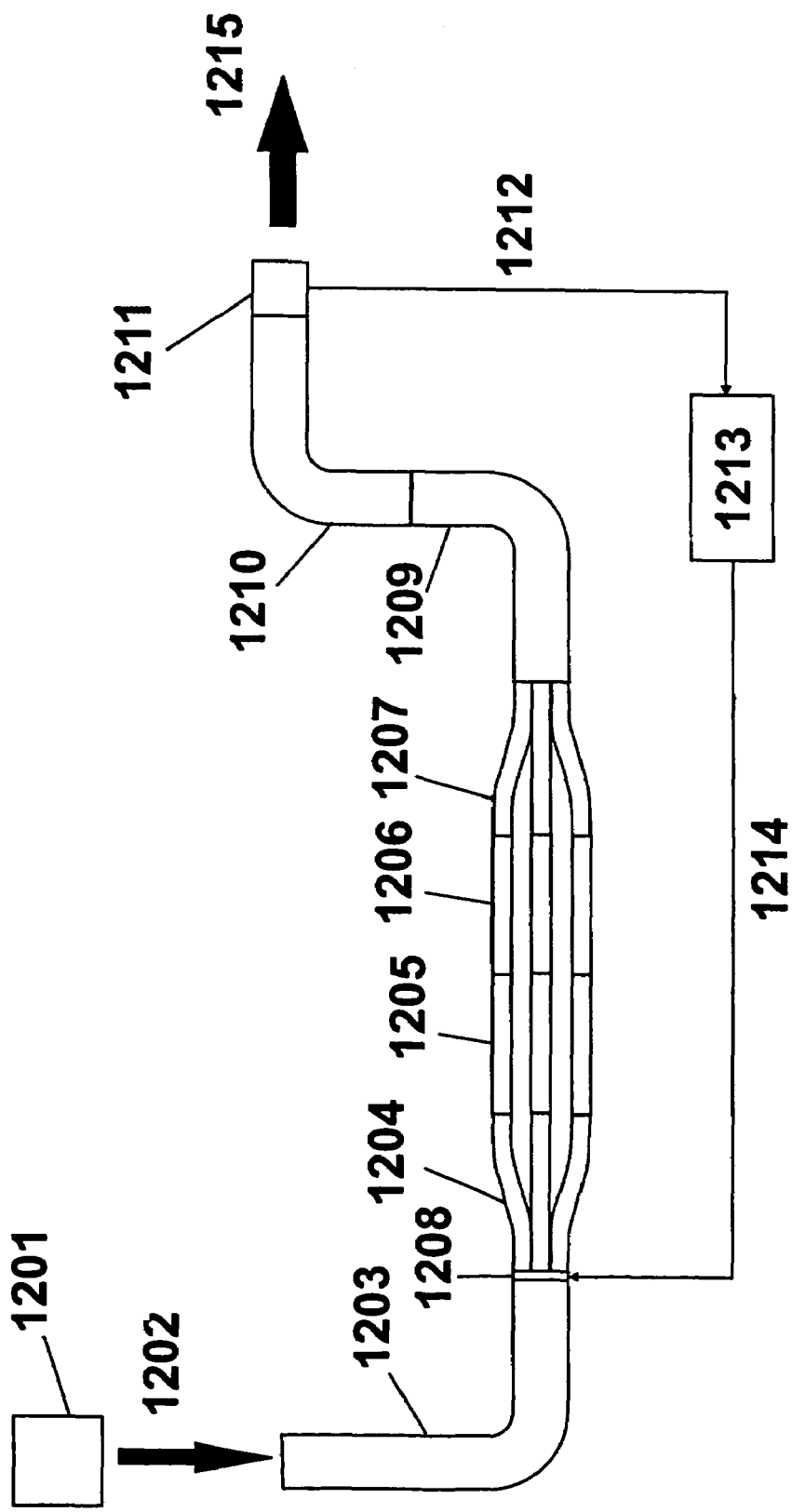
FIG. 9 illustrates a high power system architecture incorporating beam splitting, amplification, coherent beam combination, and beam transport.

It is evident that the invention provides for a method to combine many beams into a single beam of very high power. Because of the high power, it is undesirable to insert optics (particularly coated optics that may be susceptible to damage) into the combined beam. In general, a beam generated at one location still needs to be transported to another location. Hollow waveguides may serve this purpose very well, since it has been demonstrated that not only straight but also curved, hollow waveguides may be used to transport light between physically separate locations. Such transport may be implemented by, for example, close-coupling a beam combination waveguide to transport waveguides. Combining transport waveguides and active elements (lasers and amplifiers) with the elements of the present invention therefore permits the possibility of constructing high power laser systems largely or entirely from waveguide components. FIG. 9 illustrates an example of a complete generation, amplification, and delivery architecture according to the invention.

In FIG. 9, a master oscillator 1201 produces frequency stable light beam 1202 that is injected into a transport waveguide 1203 that may be straight or may be curved as illustrated to transport light from one location to another. The transport waveguide 1203 may be designed to produce three beams at the output so that the output beam may be coupled into three separate waveguides 1204. A phase adjuster section 1208 may be inserted before the beams are separated into waveguides 1204. Alternatively the phase adjuster section 1208 may be inserted at the end of waveguides 1204 or at other suitable locations along the beam paths prior to the beams being recombined. Waveguides 1204 may be followed by further transport sections 1205 and the beams coupled into amplifier sections 1206. Following the amplifiers 1206, the separate beams are coupled into transport sections 1207 and are next coupled into a beam combination section 1209. Beam combination section 1209 may be configured similar to combiner 800 of FIG. 8 and be straight or may be curved and may be followed by additional transport sections 1210 to route the laser emission to a desired location. The transport section is followed by a detection system 1211 that feeds signals 1212 to a servo 1213 that adjusts the phase adjuster 1208 using a signal 1214, such that the output beam 1215 from the system has the desired transverse profile. Many variations on this example are possible as it is included to illustrate the general use of elements that may be combined to produce the desired phase-locked high power output starting with a low power master oscillator beam. Although not illustrated explicitly it is also evident that waveguide beam steering can be incorporated into such an architecture using for example the technique described above.

Figure 10:
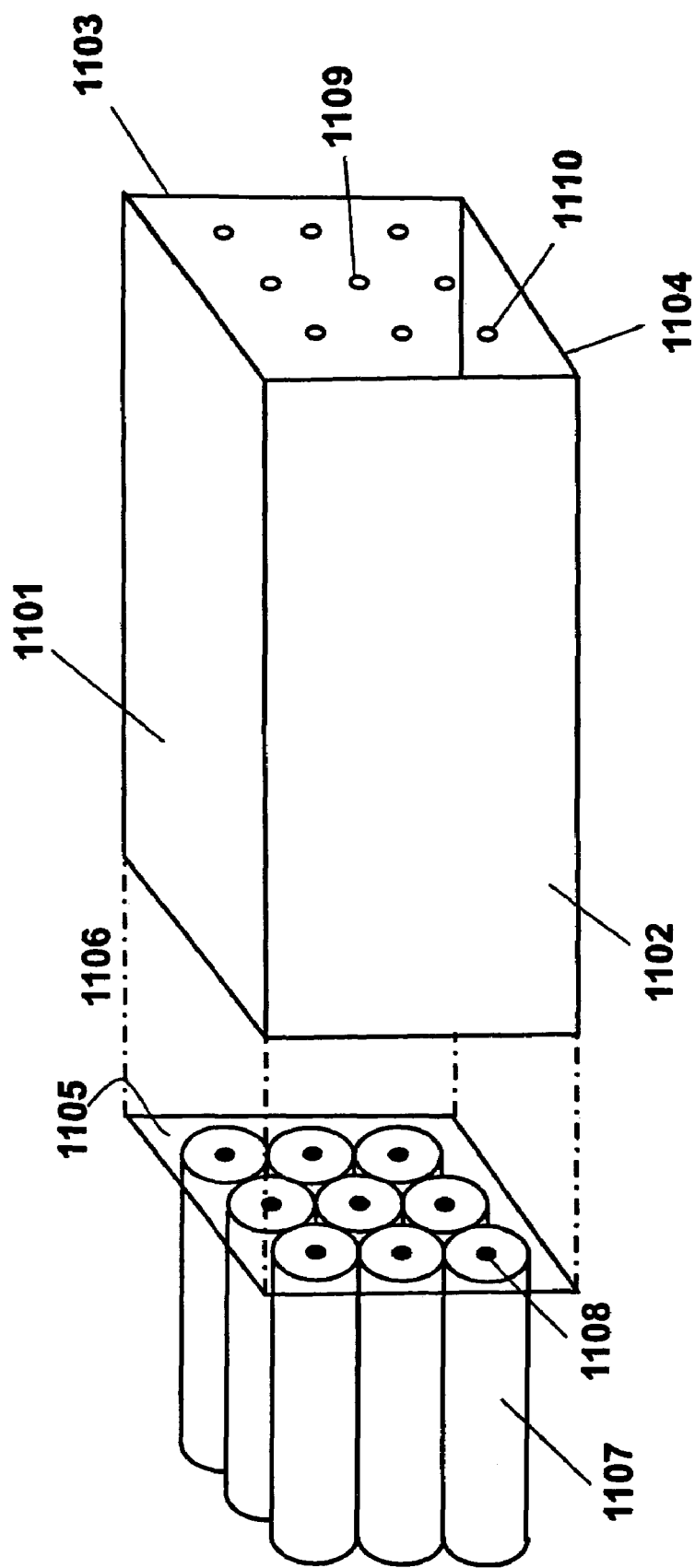
FIG. 10 illustrates coherent beam combination using a 2-dimensional square waveguide geometry.

The concepts disclosed here are not limited to beam combination of a linear (one-dimensional) array of laser beams but can also be extended to two dimensions (2D). An exemplary configuration is illustrated in FIG. 10. In the simplest 2D case, a square waveguide is constructed from a top element 1101, a bottom element 1104 and 2 sides or side elements 1102 and 1103. Beams to be combined are input at the input face 1105 shown projected away from the waveguide by projection lines 1106 for clarity. In the illustrated case, nine fibers 1107 arranged in a square geometry are placed at the input plane. Each fiber delivers laser power through a core 1108. When the length of the waveguide is chosen to equal one Talbot length, nine images of the fibers will be formed at the output from the waveguide. For other proper choices of length, different numbers of beams will appear at the output. For example, if the length equals ¹⁄₁₂ of a Talbot length, the 9 input beams will be combined into a single beam 1109 at the center of the waveguide output. The discussion above relating to phase control of the beams also applies to the 2D case. For coherent combination, it is preferable that a 2D distribution of beams be individually phase controlled. With such individual phase control, it is also possible to steer a combined beam to a different location at the output end. For example, phase adjustments of the individual beams can be used to steer the output beam to location 1110 rather than location 1109.

The discussion above has referred to the waveguides as hollow, that being the preferred case where very high power are involved. At the same time it is noted that the principles of the invention apply to waveguides filled with solids, liquids, or gases.

In principle, there are no restrictions on the types of lasers that can benefit from the beam combination methods disclosed here. To be most useful for generation of very high laser powers, it is, however, desired that the lasers have the following characteristics:

High optical efficiency. Poor efficiency means that great amounts of power must be disposed of, typically as heat. This condition favors solid-state lasers operating near 1 micrometer, such as Nd and Yb lasers. It is an addition beneficial if the lasers have high emission cross-sections and/or long lifetimes, and are 4-level or nearly so. These factors are desirable to ensure that efficient amplifiers can be constructed.

Good and reproducible beam quality. Coherent beam combination has the highest efficiency if the individual beams have the same beam profile. In general, this is easiest to satisfy if the beam quality is diffraction limited or nearly so. This condition favors guided beam lasers, such as fiber lasers, waveguide lasers, and semiconductor lasers. Generally, the amplitude or intensity distribution is less important than that the input beams have a deterministic spatial phase so that it can be used for phase control.

Compatible form factor. Combination of multiple beams using the disclosed method requires that multiple individual beams be brought together in proximity for input to a relatively small waveguide. Guided beam lasers are again a preferred choice, particularly flexible lasers that can be routed to a specific injection point at the input to a waveguide.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An apparatus for combining two or more laser beams from one or more sources into a high-power output beam, comprising:
    a waveguide comprising an inlet and an outlet at opposite ends of two waveguide elements each having a planar reflective surface, wherein the reflective surfaces are parallel; and
    means for controlling a phase of each of two or more laser beams input at the inlet to produce a coherently combined laser beam at the outlet of the waveguide having a power of at least about 1 kilo Watt,
    wherein the planar reflective surfaces have substantially equal lengths that are an integer fraction of the self-imaging length of the waveguide.

2. The apparatus of claim 1, wherein the phase controlling means comprises a phase adjuster for at least all but one of the input laser beams and wherein the phase adjusters operate in conjunction such that the input laser beams are substantially phase-locked at the inlet to the waveguide.

3. The apparatus of claim 2, wherein the phase controlling means comprises optical elements downstream of the outlet to the waveguide to provide one or more feedback beams and a control mechanism to actively adjust the phase adjusters based on the feedback beams and an optimization criterion to provide the phase-locked input beams at the inlet to the waveguide.

4. The apparatus of claim 3, wherein the optimization criterion is one from the group consisting of: minimizing $M^2$, minimizing sidelobe power, minimizing transverse intensity variations, maximizing Strehl ratio and maximizing on-axis beam intensity, wherein $M^2$ is a beam quality measurement comparing a space bandwidth product of a beam to a space bandwidth product of an ideal beam.

5. The apparatus of claim 1, wherein the waveguide is a self-imaging waveguide (SIWG).

6. The apparatus of claim 1, wherein the input laser beams have a super-Gaussian intensity profile.

7. The apparatus of claim 1, wherein the input laser beams each have a width and wherein the input laser beams are presented at the inlet to the waveguide with separation distances from adjacent ones of the input laser beams selected from the range of about twice the width of a smaller one of the adjacent beams and about ten times the width of the smaller one of the adjacent beams.

8. An apparatus for combining two or more laser beams from one or more sources into a high-power output beam, comprising:
    a waveguide comprising an inlet and an outlet at opposite ends of two reflective waveguide elements; and
    an amplifier system including a set of amplifiers each amplifying one of a plurality of laser beams input to the amplifier system, wherein the amplifier system outputs the amplified laser beams to the inlet of the waveguide,
    wherein the waveguide is a self-imaging waveguide (SIWG) with a length of about an integer fraction of the self-imaging length of the waveguide, and
    wherein the amplified laser beams provided to the inlet of the waveguide are coherently combined into a substantially singular laser beam at the outlet of the waveguide.

9. The apparatus of claim 8, wherein the input laser beams have a super-Gaussian intensity profile.

10. The apparatus of claim 8, wherein the amplifier system comprises a phase adjuster for each of the input laser beams and wherein the phase adjusters operate in conjunction such that the input laser beams are substantially phase-locked at the inlet to the waveguide.

11. The apparatus of claim 8, wherein the substantially singular laser beam has a power of at least about 1 kW, the apparatus further comprising a source operating in a wavelength range of less than about 1.7 micrometers for providing the input laser beams to the amplifier system.

12. The apparatus of claim 8, wherein the waveguide is a two-dimensional SIWG with a substantially square cross section relative to the path of the input laser beams.

13. The apparatus of claim 8, wherein the waveguide comprises an elongate hollow chamber defined by two planar reflective elements and wherein the input beams pass from the inlet to the outlet through the hollow chamber.

14. A method of coherently combining laser beams into a high-power output beam, comprising:
    providing a self-imaging waveguide (SIWG) with an inlet and an outlet;
    generating two or more input laser beams each having a phase;
    amplifying the input laser beams to produce amplified beams;
    transmitting the amplified beams to the inlet of the SIWG; and
    controlling the phases of the input laser beams to produce a coherently combined laser beam formed from the amplified beams at the outlet of the SIWG,
    wherein the SIWG has a length of about an integer fraction of the self-imaging length of the waveguide.

15. The method of claim 14, wherein the controlling of the phases comprises monitoring the output beam and shifting one or more of the phases of the input laser beams to phase-lock the input laser beams based on the monitoring.

16. The method of claim 14, wherein the combined laser beam has a power of at least about 1 kW and wherein the controlling of the phases is performed to select an output location of the coherently combined laser beam relative to the outlet of the SIWG.

17. The method of claim 14, wherein the generated input laser beams have a super-Gaussian profile.

18. The method of claim 14, wherein the amplified beams are transmitted with a separation distance selected from the range of about 2 to 10 times the width of the amplified beams.

* * * * *

UNITED STATES PATENT AND TRADEMARK OFFICE
CERTIFICATE OF CORRECTION

PATENT NO.       : 7,239,777 B1                                    Page 1 of 1
APPLICATION NO.  : 11/372420
DATED            : July 3, 2007
INVENTOR(S)      : Christensen et al.

It is certified that error appears in the above-identified patent and that said Letters Patent is hereby corrected as shown below:

ON THE TITLE PAGE:

(75) Inventors: "Jose Robert Unternahrer" should read --Josef Robert Unternahrer--

Signed and Sealed this

Eighth Day of April, 2008

JON W. DUDAS
*Director of the United States Patent and Trademark Office*